United States Patent [19]

Valentine

[11] 3,986,277

[45] Oct. 19, 1976

[54] EDUCATIONAL DEVICE FOR LEARNING DISC BRAKE FUNDAMENTALS

[75] Inventor: Charles G. Valentine, Stamford, Conn.

[73] Assignee: Xerox Corporation, Stamford, Conn.

[22] Filed: Sept. 11, 1974

[21] Appl. No.: 504,941

Related U.S. Application Data

[63] Continuation of Ser. No. 383,235, Aug. 27, 1973, abandoned, which is a continuation-in-part of Ser. No. 345,920, March 29, 1973, abandoned.

[52] U.S. Cl. .................................... 35/13; 35/7 A; 40/142 A
[51] Int. Cl.² ........................................ G09B 25/02
[58] Field of Search ............. 35/7 R, 7 A, 8 R, 8 A, 35/9 R, 9 A, 9 B, 10, 13, 19 R, 19 A, 28, 30, 48 R, 49, 53, 54; 40/142 A

[56] References Cited
UNITED STATES PATENTS

| | | | |
|---|---|---|---|
| 3,077,696 | 2/1963 | Barnett et al. .................... | 35/19 A X |
| 3,245,156 | 4/1966 | DeBloois et al. .................. | 35/8 A |
| 3,423,846 | 1/1969 | Arend ............................... | 35/19 A |
| 3,514,873 | 6/1970 | Stobbe ............................. | 35/7 A X |
| 3,538,626 | 11/1970 | Frank ................................ | 35/48 R |
| 3,651,592 | 3/1972 | McCormick ........................ | 40/142 A |

OTHER PUBLICATIONS

Rosengren; H. J., "Three Dimensional Teaching Aids for Trade and Industrial Instruction," 1961, p. 6.
*The Way Things Work*, Simon and Schuster, New York, 1967, pp. 512–515.

*Primary Examiner*—Richard C. Pinkham
*Assistant Examiner*—Vance Y. Hum

[57] ABSTRACT

An educational kit for teaching the operation and mechanism of automotive disc brakes is disclosed. The kit comprises audiovisual instructional equipment, a simulator board upon which is graphically depicted indicia representing a schematic diagram of an automotive steering knuckle and a schematic outline of a disc brake caliper, and a plurality of manipulative pieces upon which are graphically depicted schematic diagrams of various parts of an automotive disc brake system. The pieces are adapted to be positioned on the simulator board such that the user of the kit may graphically depict the assembly, relationship of parts, and operation of a disc brake system.

7 Claims, 7 Drawing Figures

AUDIO VISUAL MEANS

WORK SHEETS

EDUCATIONAL DEVICE FOR LEARNING DISC BRAKE FUNDAMENTALS

This is a continuation of application Ser. No. 383,235 filed Aug. 27, 1973, now abandoned, which was a continuation-in-part of Ser. No. 345,920, filed Mar. 29, 1973, now abandoned.

BACKGROUND OF THE INVENTION

The present invention relates to a portable, compact and easily assembled educational kit. More specifically, the present invention is directed towards an educational kit for teaching the assembly, relationship of parts and operation of an automotive disc brake system comprising as the essential components thereof an audiovisual instructional means, a simulator board bearing graphic indicia thereon, and a plurality of manipulative pieces bearing graphic indicia thereon, which indicia is relatable to the indicia present on the simulator board such that the student can demonstrate his understanding of the fundamentals of the disc brake assembly by arranging certain of the manipulative pieces on the board in a logical sequence.

A problem of increasing difficulty in the education field is that of providing a relatively simple means for instructing students, whether in the classical elementary or high school subjects, or in the various occupational technologies. The effectiveness of the traditional method of teaching involving the teacher/textbook/student relationship is measured not so much by the qualitative aspects of the information conveyed, but rather by how much of the information conveyed is absorbed, understood and learned by the particular student. In recent years the trend in education has witnessed the introduction of a number of educational teaching devices generally aimed at the pre-college or pre-high school age group. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few educational devices available in the community colleges, the junior colleges, the vocational high schools, the trade schools and other special schools where various types of occupational technologies are sought to be taught on a simplified and individualized basis.

Accordingly, it is an object of this invention to provide programmed educational kits which present information using a multimedia approach.

Another object is to provide an educational kit comprising instructional means and simulator means for teaching the assembly, relationship of parts and operation of an automative disc brake assembly.

Another object is to provide an educational kit which is simple, relatively inexpensive, rugged, easily assembled, relatively portable and easily understood.

Another object is to provide an educational kit designed for use by individual students comprising audio, visual or audiovisual instructional means, a simulator board bearing graphic indicia, and a plurality of manipulative pieces bearing graphic indicia depicting schematic diagrams of various parts of a disc brake system, or word indicia naming various parts of said system, whereby the student may position the pieces at the appropriate indicia present on the simulator board in response to the instructional means to graphically depict construction of a disc brake assembly and physically simulate the operation thereof.

SUMMARY OF THE INVENTION

In accordance with the objects and teachings of the present invention, a simple and effective educational kit or unit for the teaching of an automotive disc brake assembly as provided. The unit comprises an instructional means, a simulator board upon which is graphically depicted indicia representing schematic views of an automotive front end steering knuckle and the outline of a disc brake caliper, and a plurality of pieces upon which are graphically depicted schematic diagrams of various component parts of a disc brake system or certain descriptive word indicia. The kit may also comprise a display board which provides for storage and easy access to the various pieces when the kit is in use. The kit is designed to present the fundamentals of the automotive disc brake system whereby the student learns the assembly, relationship of parts and operation of said system. This information is conveyed to the student using a programmed multimedia approach whereby the student hears and sees information, performs by answering questions, solving problems and manipulating objects. The kit is designed for individual use or for use by small groups without the need for extensive supervision or participation by an instructor. It permits the student to learn at his own pace and also affords him the chance to capitalize on the way he learns best because he participates in different kinds of learning experiences. He listens to information while viewing a series of related visuals and participates in a manipulative activity which gives him the chance to try doing himself what he has been shown or told how to do. Each time a student learns something new, he responds to this new knowledge or skill to make sure he has learned it correctly. First, he performs an activity such as answering a question, solving a problem or manipulating a device. Then he finds out immediately if the action is correct by comparing the result of this action with the one provided by the program. If the student finds that his answer is correct, this instant feedback and learning reinforcement motivates him to continue learning. If he discovers that his answer is wrong or inadequate, he can stop at that point and find out where his error is.

DETAILED DESCRIPTION OF THE INVENTION

Various kinds of instructional means can be employed with the educational kit of this invention. For example, one of the preferred instruction means is an audiovisual presentation using slides or filmstrips in conjunction with a descriptive audio account of the visuals, presented by means of tapes or audio cassettes. A recorded narrator provides background information relating automotive disc brake system including the parts thereof, how the system operates, how it compares with the drum brake system, advantages and disadvantages, and the like. During this audio presentation, a series of synchronized related visuals are shown to the students. These visuals comprise photographs or diagrams of the various disc brake parts and how they are assembled, as well as diagrams of the disc brake system during various phases of operation.

The audiovisual equipment needed will vary depending on the type of instruction to be given. A rear screen projector for small groups, or a projector and screen for a classroom presentation may be used. For the audio presentation, either visual projection equipment with built-in audio capability or a separate cassette recorder may be used. The instructional means provided with the educational kit includes a visual segment available, for example, on 35 mm slides or filmstrips, and an audio segment available on cassettes. The supporting equipment is normally not included with the kit.

At various points during the presentation, the student is requested to stop the audiovisual presentation and perform certain activites using the simulator board and pieces associated therewith. For example, he may be requested to position pieces depicting the disc brake caliper, the brake pads, the splash shield, the disc or rotor and the like in their proper positions relative to the steering knuckle diagram present on the simulator board, and label the various components so placed using other pieces bearing indicia naming these parts. The simulator activity thus allows the student to use his hands as a learning tool, as well as his eyes and ears. By performing an activity using the simulator board and its accessories, the learning process is reinforced and the student takes an active part in learning and achieves understanding more quickly.

The simulator board and the accessories are best described with reference to the attached drawings.

The simulator board may be constructed of a magnetically attractive sheet of rigid material such as ferrous metal or a magnetic ferrit plastic, or a thin sheet of ferrous metal coated with a thin layer of plastic material. The surface of the board is painted with a neutral background color such as a white or yellow enamel. The graphic indicia present on the board may be printed over the enamel in a suitably contrasting color such as black. Printing may be accomplished by any suitable means such as, for example, a silk screening process. Atlernatively, the indica may be printed on a sheet of clear plastic adapted to be superimposed over a blank board. Although the simulator board may consist solely of a thin sheet of metal with suitably smooth edges, the metallic sheet may also be laminated to a suitable backing member which imparts suitable rigidity thereto. Thus, the simulator board may comprise a thin sheet comprising ferrous metal having a thickness of about 1/32 inch laminated to a backing member made from a rigid material such as fiberboard, or a resinous material, said backing material having a preferred thickness of about ¼ inch. The dimensions of the simulator board should be such that the board can be conveniently used by the student at a given workplace. Boards having dimensions of about 15 × 20 inches, or approximately 300 square inches, are particularly suitable.

Figure 2:
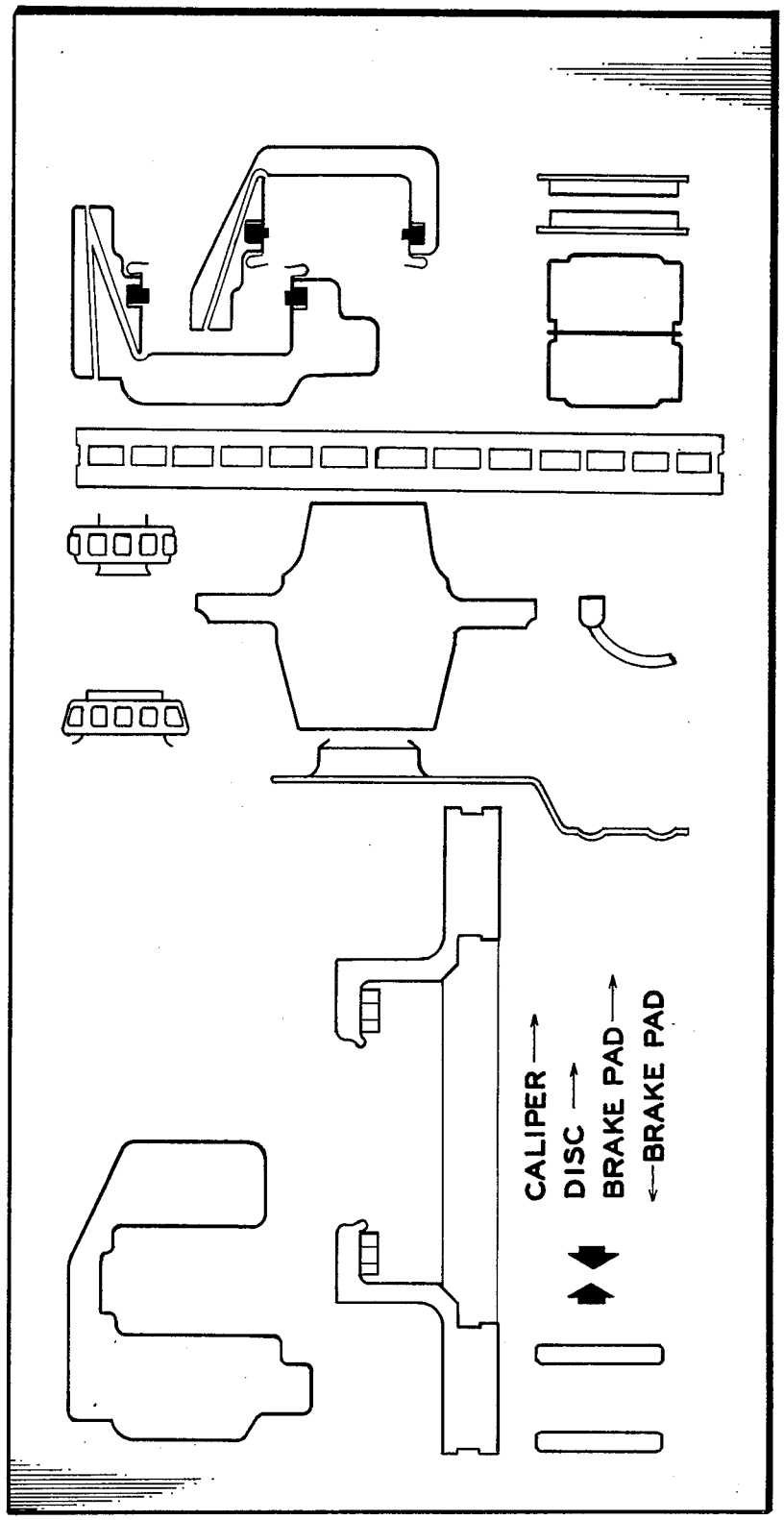
FIG. 2 is a plan view of the display board with graphic indicia thereon.

In FIG. 2 a display board is shown having printed thereon graphic indicia depicting various parts for a disc brake system and certain descriptive word indicia. The display board is also constructed on a magnetically attractive material similar to the simulator board and the background indicia may be printed thereon in the same way. The purpose of the display board is to serve as a display and storage area for the magnetically attractive pieces which are used in conjunction with the simulator board. Each of the graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
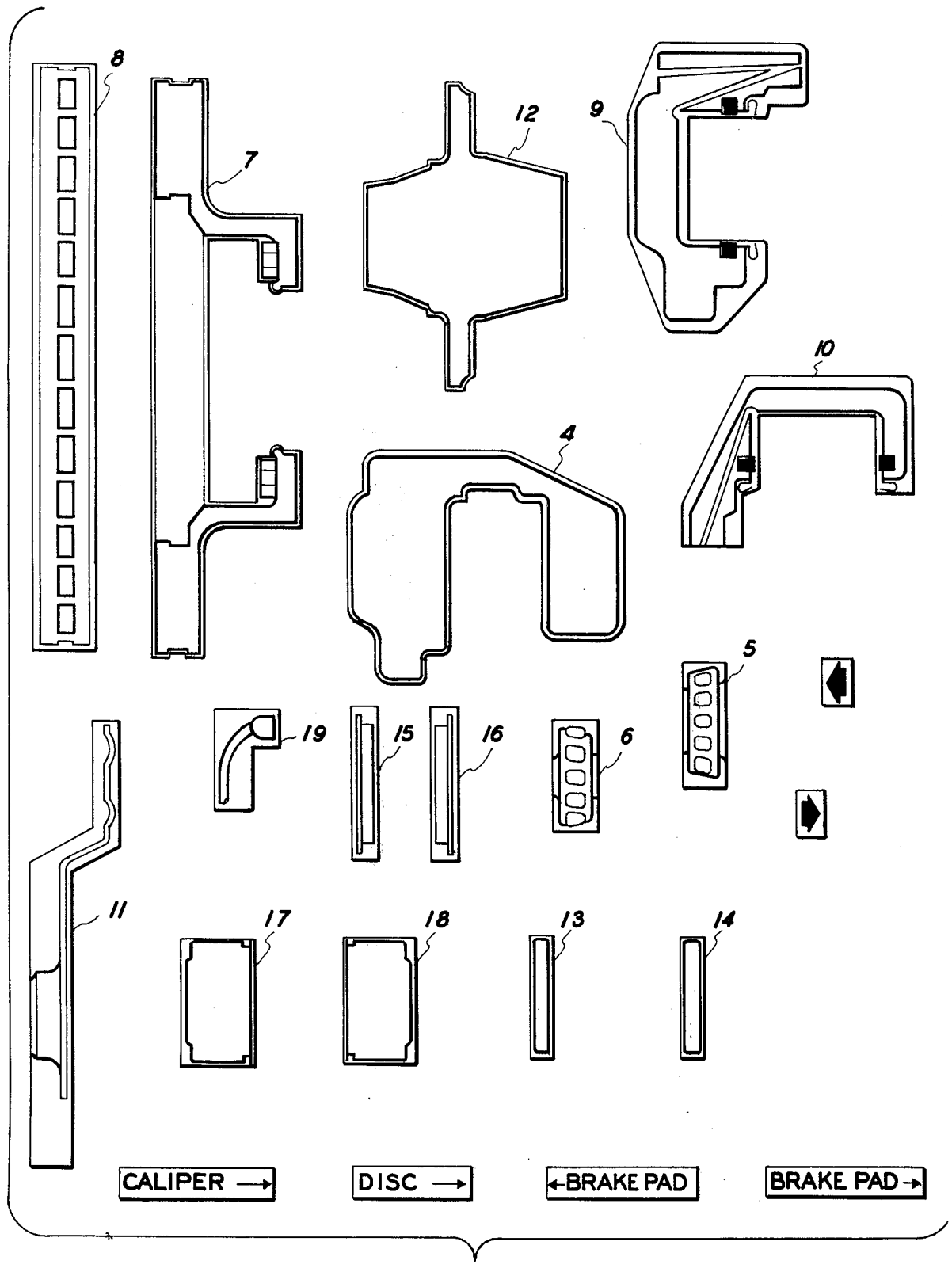
FIG. 3 is a plan view of the manipulative pieces having graphic indicia thereon.

The manipulative pieces used in the educational kit of this invention are shown in FIG. 3. Each of these pieces is made of a flat sheet of a rigid material such as metal or plastic and has laminated to the underside thereof smaller pieces of a magnetically attractive material such as metal or ferrite plastic. The preferred thickness of the pieces is approximately 1/16 of an inch and the thickness of a smaller section laminated to the underside of the pieces is about 3/32 of an inch.

As shown in FIG. 3, some of the pieces bear indicia depicting sechmatic side view diagrams of various of the component parts of a disc brake system and other of the pieces bear word indicia. Piece 4 depicts a disc brake caliper, pieces 5 and 6 depict inner and outer wheel hub roller bearings respectively, piece 7 depicts a disc or rotor, piece 8 depicts a ventillated disc or rotor, pieces 9 and 10 depict sectioned views of caliper halves, piece 11 depicts a splash shield, piece 12 depicts a wheel hub, pieces 13, 14, 15 and 16 depict brake pads, pieces 17 and 18 depict wheel caliper pistons, and piece 19 depicts a brake hose. Also shown are pieces bearing word indicia: "CALIPER", "DISC" and two pieces bearing indicia "BRAKE PAD", which pieces may be used to lable the corresponding pieces when placed on the simulator board. Also shown are two pieces depicting an arrow which may be used to show direction of movement of the brake pads during various phases of operation.

Pieces 9, 10 and 15–18 are adapted for use in conjunction with indicia 3 present on the right side of the simulator board such that the student may simulate the construction and operation of the disc brake caliper; the remaining pieces are adapted for use with indicia 2 present on the left side of the simulator board. For example, by properly superimposing caliper halves 9 and 10 over caliper outlined 3 the student can visualize the inner construction of the caliper; the caliper mechanism is further elucidated by placing piston members 17 and 18 within the gaps of the caliper halves, and thereafter by proper placement of brake pads 15 and 16. A broader understanding of the disc brake construction and mechanism is afforded the student by proper placement and manipulation of the other pieces in association with the steering knuckle diagram shown at 2 on the simulator board as will be hereinafter described.

Figure 4:
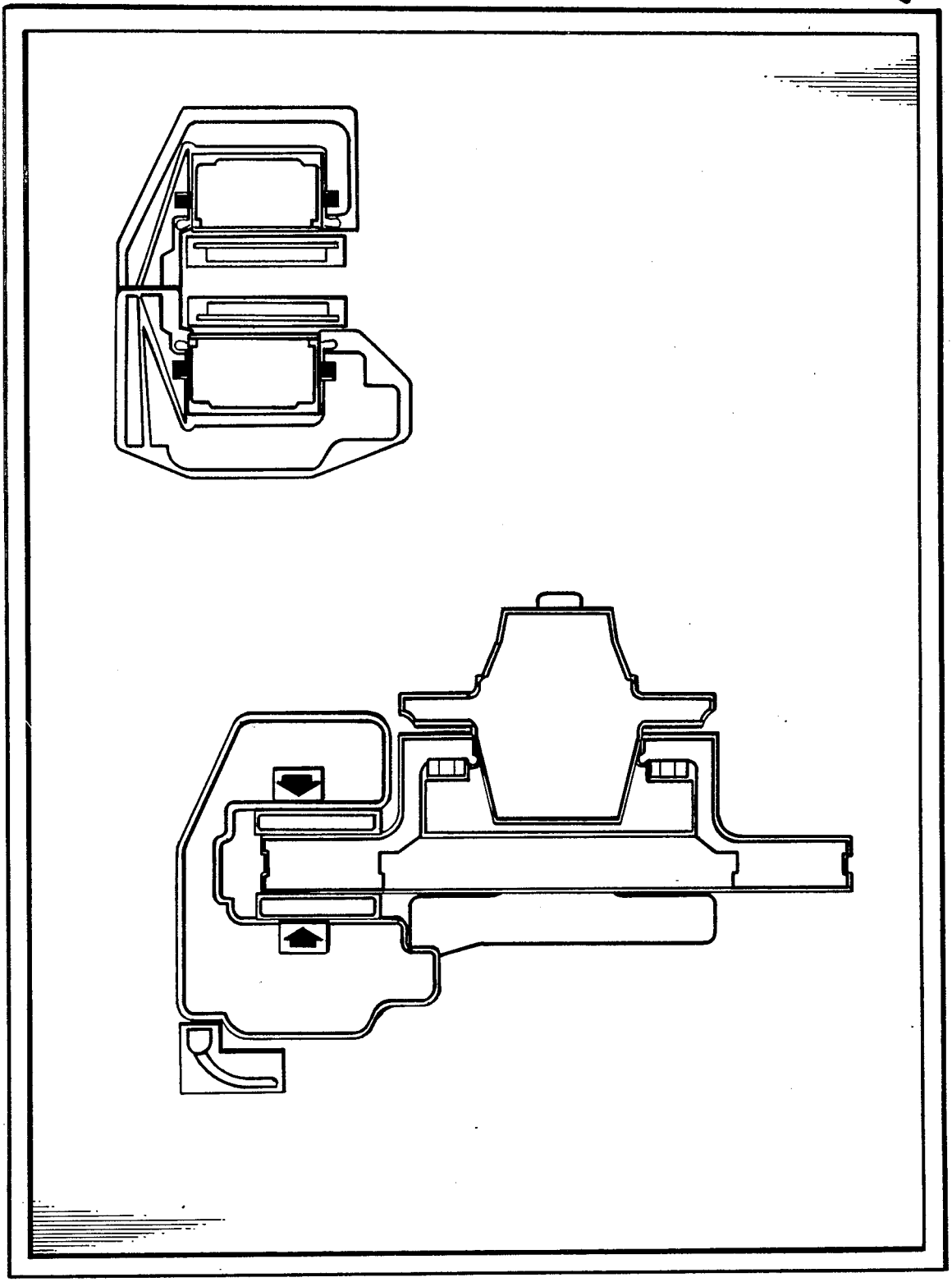
FIG. 4 is a plan view of the simulator board with certain of the manipulative pieces in place.
Figure 5:
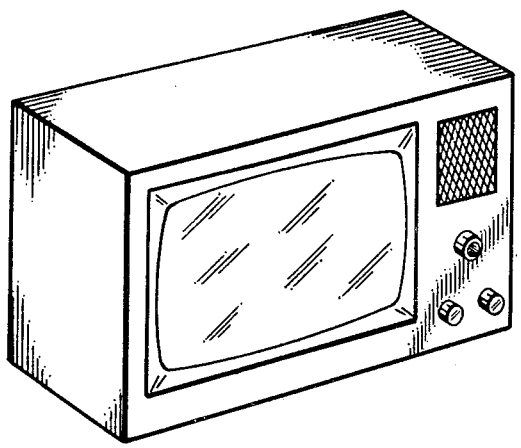
FIG. 5 illustrates generally an audiovisual device suitable for use in the present invention.
Figure 6:
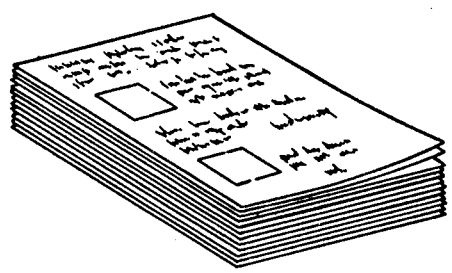
FIG. 6 illustrates generally worksheets in accordance with the present invention.
Figure 7:
FIG. 7 is a side sectional view of a typical manipulative piece in accordance with the invention showing smaller magnetic sections laminated to the underside of the piece. DETAILED DESCRIPTION OF THE DRAWINGS In FIG. 1 the simulator board 1 is shown having printed thereon graphic indicia depicting a schematic side view 2 of a front steering knuckle assembly on the left side of the board and a schematic view 3 of the outline of a disc brake caliper on the right side of the board. These diagrams serve as locations for positioning the manipulative pieces in order to simulate the assembly and operation of the disc brake system as well as hereinafter described.

In FIG. 4 the simulator board is shown with certain of the manipulative pieces in place. On the left side of the board the general assembly of a disc brake mechanism has been constructed by superimposing over steering knuckle 2 pieces 4, 7, 12, 13, 14 and 19, as well as two arrows indicative of the squeezing action of pads 13 and 14 on the disc member 7. On the right side of the board, the construction of a disc brake caliper is depicted by superimposing over caliper outline 3 pieces 9, 10, 15, 16, 17 and 18.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces need only be of a material that is attracted to a magnet. In the simpler and preferred embodiment, the bases of the pieces have laminated thereto a section of a magnetic material such as magnetic plastic or metal, and the boards are made of material that is attractive to a magnet such as galvanized steel.

All of the above materials are most conveniently supplied housed in a compartmentalized case for easy use and storage. Thus, the educational kit includes the simulator board, the display board, the manipulative pieces, the visual slides or tapes and the audio cassette. The kit may also include student work sheets, sample tests or quizzes to be given by the instructor before and after use of the unit, and an instructor's manual.

To illustrate how the educational kit of the present invention is used, the audio visual presentation begins with a brief discussion of the automotive disc brake system including a comparison of disc brakes and drum brakes. The construction of each type of brake system is depicted using diagrams and the advantages of disc brakes in terms of braking power and safety and the reasons for these advantages are explored. Next, the discussion focuses on each of the major components of a disc brake system. The student is first informed about the steering knuckle, how it is attached to the car by means of upper and lower control arms, and how it is connected to the steering system by means of a tie rod. Each of the major component parts of the disc brake system are in turn discussed and the student is shown what these parts look like by means of the visual diagrams and the accompanying audio presentation.

At various points throughout the audio visual presentation, the student is requested to turn to the simulator board and the accessory pieces associated therewith in order to physically simulate the construction and assembly of the various component parts of the disc brake system. For example, the caliper and brake pad assembly can be depicted by positioning piece 4 which depicts the caliper just above the steering knuckle diagram shown at 2 on the simulator board, and by placing pieces 13 and 14 within the notch present in the caliper. Next, the relative position of the disc can be depicted by vertically positioning piece 7 such that it is symmetrical with the steering knuckle indicia 2 present on the simulator board and also such that the upper end of the disc is within the notch and brake pad members assoicated with the caliper. The basic assembly is then completed by placement of wheel hub 12 over the steering knuckle shaft and in contact with disc member 7. Arrows may be used to show the direction of movement of brake pads and piece 19 may be placed alongside caliper 4 to show how brake fluid is introduced into the caliper. This basic scheme is shown on the left side of simulator board 2 in FIG. 4.

At this point the student may be requested to remove all the pieces from the simulator board and reconstruct a disc brake system including such members as the rotor bearings, the splash guard, and the ventillated disc. This may be done by properly positioning inner and outer wheel hub rotor bearings 5 and 6 on the spindle shaft associated with the steering knuckle 2 present on the simulator board, by superimposing hub member 12 over these bearings, by positioning splash shield 11 adjacent to hub member 12, and then by positioning the caliper, disc, pads, and other pieces as indicated above. A ventillated disc may be simulated by superimposing piece 8 which depicts a ventillated disc over piece 7. The various component parts may then be labeled by selecting the pieces bearing name indicia and positioning them alongside the appropriate part.

The instructional means next goes on to a detailed discussion concerning the exact construction and operation of the dic brake caliper, including a discussion comparing the similarities and dissimilarities of this component with a wheel cylinder component of a drum brake system. The major component parts of the caliper are discussed including the caliper housing itself, the pistons, the brake pad, the piston seal, and the dust boot. This construction can be physically simulated by assembling the appropriate pieces in conjunction with indicia 3 present on the simulator board as is depicted on the right side of simulator board 2 in FIG. 4.

The above described educational kit thus provides the student with the opportunity of exploring concepts involved in the operation of a disc brake assembly and by simulating the construction and arrangements of parts involved in such assembly. The educational kit is programmed such that the student will encounter a minimum of frustration and a maximum of learning efficiency during use of the kit. Upon completion of the kit, the student should be able to identify at least six components of a disc brake; differentiate between components of a disc brake assembly and a drum brake assembly; describe the function of a splash shield in a disc brake; name the primary components in a disc brake which come in contact with one another in the braking process; discuss brake fade; discuss the relative advantages and disadvantages of disc and drum brakes; name the component which moves the brake pad toward the disc; indicate the path of force carried by the brake fluid from entry into the caliper to pressing the brake pads against the disc; identify the power assist unit, metering valve, and proportioning valve with descriptions of their functions; and the like.

A complete description of the educational kit encompassed by the present invention may be found in a booklet entitled "Automatic Technology — Disc Brake Fundamentals" (Unit 10179-80) published as part of the occupational technology series by the Xerox Corporation.

Figure 1:
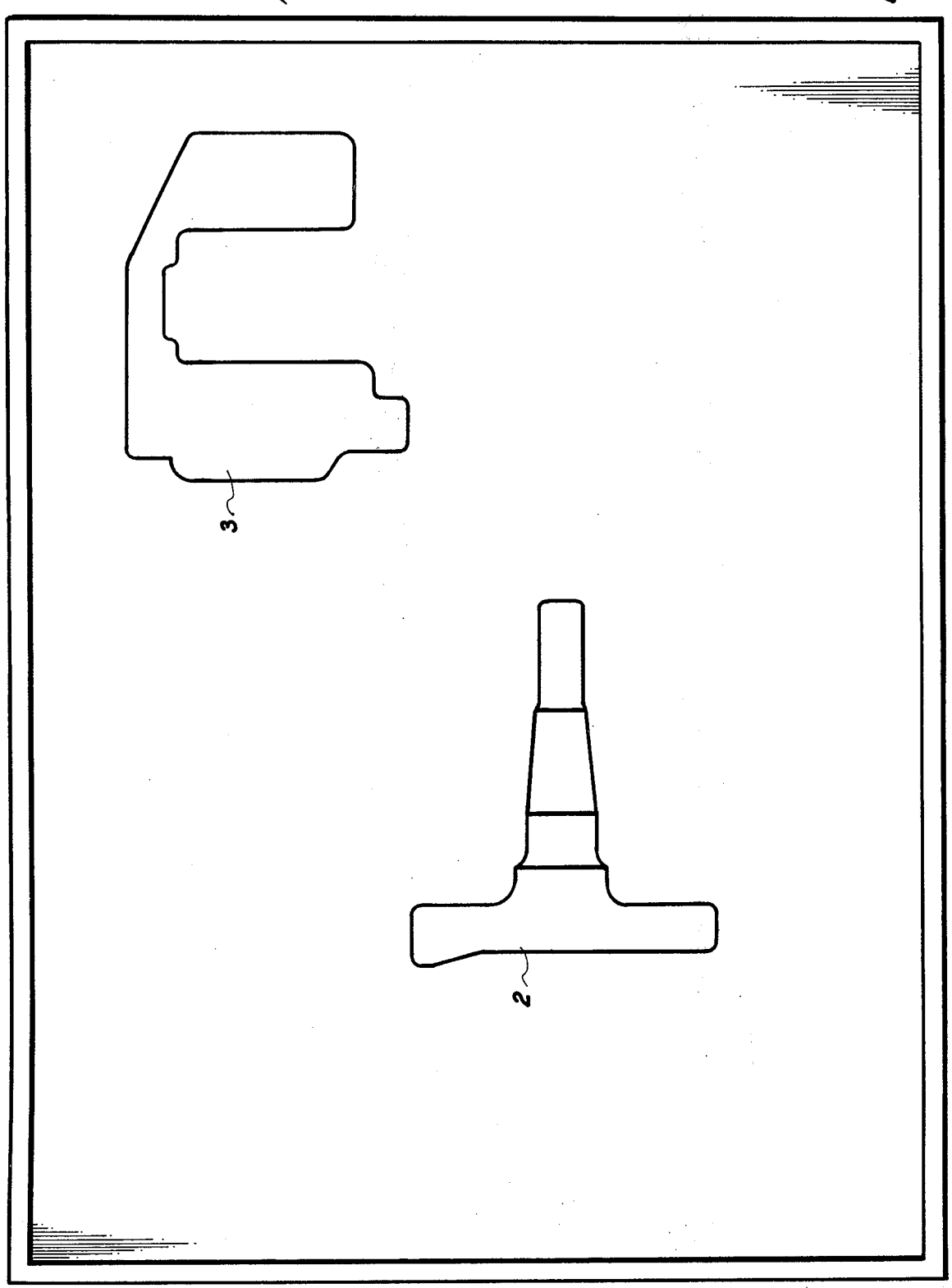
FIG. 1 is a plan view of the simulator board with graphic indicia thereon.

What is claimed is:

1. An educational kit for teaching the assembly, relationship of parts, and operation of an automotive disc brake system comprising:
   a. a simulator board having a surface of magnetically attractive material and including graphic indicia on the surface thereof as shown by reference numerals (2) and (3) in FIG. 1 defining a schematic diagram of an automotive steering knuckle and an outline of a disc brake caliper, respectively;
   b. a plurality of magnetically attractive manipulative pieces individually bearing on their surfaces graphic indicia as shown in FIG. 3, including indicia defining parts for an automotive disc brake system;
   c. a display board for said manipulative pieces including a sheet of magnetically attractive material, said display board having graphic indicia on a surface thereof in spaced relationship, said graphic indicia being identical with the indicia present on each of said manipulative pieces, said manipulative pieces adapted for storage on and removal from said display board; and
   d. audio-visual instructional means for presenting information relevant to an automotive disc brake system, including information defining a logical relationship between the indicia on said pieces and the indicia on said board;
   said manipulative pieces adapted for manipulation on the simulator board and in association with the simulator board indicia by the user in response to said instructional means such that the assembly, relationship of parts, and operation of an automotive disc brake system can be physically simulated; said magnetically attractive board or alternatively each of said magnetically attractive pieces being magnetic to provide a mutual attraction between said board and said pieces.

2. An educational kit according to claim 1 wherein said manipulative pieces are magnetic.

3. An educational kit according to claim 1 wherein said manipulative pieces comprise a flat sheet of rigid material having smaller sections of a magnetic material laminated thereto.

4. An educational kit according to claim 1 wherein said audio instruction means includes tape recordings which are synchronized with said visual instruction means which includes slides or filmstrips.

5. An educational kit according to claim 1 wherein said instruction means includes a plurality of student work sheets, said work sheets being adapted for use by the student to record information and test the student in response to said audiovisual instruction means.

6. An educational kit according to claim 1 wherein said simulator board, said manipulative pieces, and said display board are constructed of a substantially rigid material.

7. An educational kit according to claim 1 further comprising a compartmentalized case, said case being adapted for storage of said kit.

* * * * *